United States Patent

Berchielli

[11] Patent Number: 4,811,481
[45] Date of Patent: Mar. 14, 1989

[54] METHOD OF BEADING DEFORMABLE ELECTRODES

[75] Inventor: Aldo S. Berchielli, Westerly, R.I.

[73] Assignee: Yardney Corporation, Pawcatuck, Conn.

[21] Appl. No.: 780,765

[22] Filed: Sep. 27, 1985

[51] Int. Cl.$^4$ .............................................. H01R 43/00
[52] U.S. Cl. .................................... 29/825; 29/623.4; 429/119
[58] Field of Search ..................... 29/825, 623.4, 623.5; 156/298; 427/180; 429/119

[56] References Cited

U.S. PATENT DOCUMENTS

| | | | |
|---|---|---|---|
| 2,988,587 | 6/1961 | Haring | 429/119 |
| 3,012,087 | 12/1961 | Van Billiard et al. | 429/119 X |
| 3,317,350 | 5/1967 | Murphy | 429/119 |
| 3,472,699 | 10/1969 | Jackley et al. | 429/119 X |
| 3,515,596 | 6/1970 | Doll et al. | 29/623.4 |
| 4,133,227 | 1/1979 | Crowe et al. | 76/107 R |
| 4,276,110 | 6/1981 | Bilhorn | 427/180 X |

Primary Examiner—Howard N. Goldberg
Assistant Examiner—Carl J. Arbes
Attorney, Agent, or Firm—Donald E. Nist

[57] ABSTRACT

An improved method of beading deformable electrodes is provided which method comprises forming a plurality of spaced depressions, preferably simultaneously, as through the use of a novel beading tool, in at least one surface of a deformable electrode and then adhesively binding nonconductive beads in said depressions so as to collectively form a nonconductive separator on said surface. The method is applicable for use with metallic electrodes such as sintered silver or nickel or cadmium plaque electrodes, the surfaces of which are not subject to easy plastic flow at relatively low pressure, in contrast to silver chloride plates. Preferably the depressions are hemispherical and the beads are spherical so that a substantial portion of each bead extends outwardly from the beaded electrode surface. The dimpling can be carried out effectively through the use of an improved novel tool which comprises a flat plate having a plurality of spaced apertures extending from the top to the bottom thereof at about a 90° angle to the main plane of the plate. A plurality of pins are releasably disposed in these apertures, one per aperture, each pin having an expanded head or the like to releasably retain it in the plate and a depression-imparting protrusion at the lower end thereof. The protrusion is preferably hemispherical and extends below the bottom of the plate. The tool also includes means for releasably locking the pins in the plate. Such means can include a second flat plate parallel to and above the first plate and releasably secured thereto by a hinge and latch to trap the pinheads therebetween. The tool simultaneously forms a plurality of spaced depressions in the surface of the electrode when forced thereagainst, as by a press, as by hammering or by other suitable pressure imparting means. The method and tool are simple and effective in providing the adhered bead separator on the face of the electrode.

1 Claim, 1 Drawing Sheet

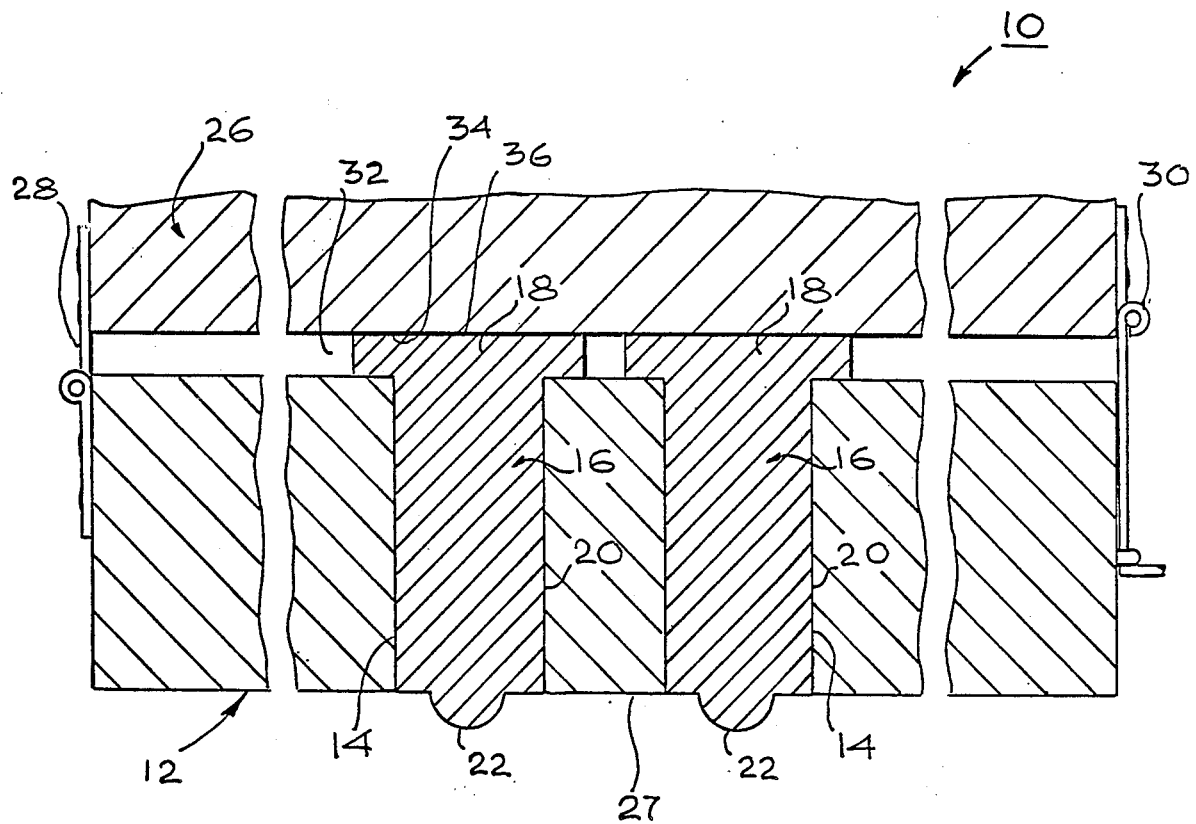

METHOD OF BEADING DEFORMABLE ELECTRODES

BACKGROUND OF THE INVENTION

1. Field of the Invention

The present invention generally relates to electrochemical components and more particularly to an improved method of forming an adhered bead separator on the face of an electrode and an improved tool for use with said method.

2. Prior Art

For many years silver chloride electrode plates have been beaded or studded with small electrically nonconductive glass or plastic beads by embedding the beads under pressure in the surface of the plates. The conventional method of accomplishing this is to hold the beads in a spaced configuration in a specially fabricated hardened alloy steel die. The die contains very small holes therethrough with chamfers. The dies are very difficult and expensive to fabricate because the holes must be smaller in diameter than the beads, that is, less than about 0.035", and the depth of the countersink or chamfer determines the thickness of the finished plate. The die is used in the case of silver chloride plates to embed the beads in the surface of the plates. The plastic silver chloride which is displaced during the embedding flows up plastically around the bead and is shaped by the countersink or chamfered surface to form a skirt around the bead which is higher than the centerline of the spherical bead and which thus holds the bead firmly in position on the surface of the silver chloride plate during use of the plate. As indicated above, the die is expensive and difficult to fabricate. Normally, a relatively inexpensive pilot hole is first drilled partly through the plate and then the expensive small hole is drilled the rest of the way through the plate, after which the outside end of the hole is chamfered.

The same type of tooling has been used to apply the beads to surfaces of electrodes which do not have plastic flow properties but which require or for which it is desired to provide bead separators. In such instances the beads have been adhesively joined to the electrodes, specifically to depressions in the electrodes after drilling those depressions or forcing the beads against the electrode surfaces to depress the same. Crushing of the beads can occur under such circumstances.

Accordingly, it would be desirable to provide an improved method and equipment for beading the surfaces of deformable electrodes which do not have plastic flow properties. Such method and, equipment should be relatively simple, inexpensive and efficient.

SUMMARY OF THE INVENTION

The foregoing needs have now been satisfied by the improved method and tool of the present invention. The method and tool are substantially as set forth in the Abstract above. Thus, the method involves forming depressions in the surface of a deformable electrode such as silver plaque, nickel plaque, cadmium plaque or the like through the use of a special tool which is inexpensive to fabricate and use, and then attaching the beads in the depressions by means of adhesive. This procedure is utilized in place of forcing the beads against the electrode surface to cause the beads themselves to deform the electrode surface. The beads are relatively fragile and can be crushed during such deforming operation. The tool can be fabricated from two unhardened steel plates or the like which retain spaced hardened pins bearing protrusions which are used to cause the desired depressions in the electrode surface. The pins are removable from the tool and therefore can be replaced when worn or damaged. Holes of any suitable diameter can be drilled through one of the plates to accept the pins. This drilling procedure is far less expensive than the small hole procedure called for in preparing the beading tools of the prior art. Various other features of the present invention are set forth in the following detailed description and accompanying drawings.

DRAWINGS

The single FIGURE is a schematic fragmentary cross-section of a preferred embodiment of the improved dimpling tool of the present invention.

DETAILED DESCRIPTION

In accordance with the method of the present invention a plurality of spaced depressions which are preferably hemispherical are formed in at least one surface of an electrode. The electrode is one which is deformable under increased pressure but is not subject to plastic flow at low pressure. Such an electrode can comprise a silver plaque electrode fabricated by sintering silver powder or a similar type of electrode utilizing nickel or cadmium-nickel or the like. Other types of metal electrodes such as zinc are also capable of being treated in accordance with the present method. The formation of the depressions is preferably accomplished through the use of the dimpling tool of the present invention such as is schematically set forth in cross-section in the single FIGURE of the accompanying drawings. Thus, the FIGURE shows a tool 10 which comprises a first flat plate 12 having a plurality of spaced apertures 14 extending therethrough from the top to the bottom thereof normal to the main plane of the plate. Plate 12 can be of any suitable thickness, for example about ⅛"-¼" or the like and of any suitable shape-retaining material such as mild steel or the like.

In apertures 14 are releasably disposed pins 16 of hardened tool steel or the like. Each pin 16 has an expanded head 18 which overlaps the upper surface of plate and thus retains pin 16 in aperture 14 so that it does not drop out of that aperture. Each pin 16 has an elongated cylindrical shank 20 terminating at its lower end in a hemispherical protrusion 22 dimensioned to extend below the bottom 27 of plate 12 as shown in the single FIGURE. Pin 16 may for example have a length of about ⅛" to about ¼" or more and a diameter of about 1/16" to about ⅛" or more. Obviously, other dimensions are suitable, depending upon the size and spacing of the beads to be embedded in the electrode surface. Tool 10 also includes an upper plate 26 parallel to plate 12 and releasably secured thereto as by hinges 28 at one end thereof and latches 30 at the other end thereof. It will be noted that in the secured position plate 26 is positioned above plate 12 to provide a space 32 within which head 18 of each pin 16 is disposed. In the secured position, the bottom 34 of plate 26 bears on the upper surface 36 of each head 18, firmly holding it in place. When it is desired to replace any pin 16, latches 30 are unhooked and plate 26 is pivoted away from plate 12 on hinges 28, allowing access to pin 16 which then can be readily withdrawn from apertures 14.

The dimpling of an electrode surface is accomplished by placing protrusions 22 thereagainst and pressing tool 10 towards that surface, either by hammering or by any other pressure or driving means. Dimpling of the electrode surfaces is accomplished throughout wherever protrusions 22 impinge thereagainst. The dimpling can be carried out very rapidly, efficiently and reproducibly.

Further in accordance with the present method, electrically nonconductive beads of glass, ceramic, plastic or the like and of suitable size to fit into the depressions formed into the electrode surface by protrusions 22 are adhesively bonded in those depressions either by coating them first and then placing the coated portions thereof in the depressions or by first coating the depressions and then adding the beads to the depressions. Such beads are dimensioned so that approximately 40 to 60% thereof protrude from the electrode surface to provide the separator effect.

In order to efficiently place the beads, they can be disposed in a rack having the same pattern as the protrusions formed in the electrode surface. The beads can be disposed in depressions in the rack and the exposed portions can be kiss coated or the like with any suitable adhesive, whereupon the dimpled surface of the electrode can be placed against the beads in the rack and when the beads adhere to the walls of the depressions in that surface, the rack can be removed. Obviously, the manner in which the beads are adhesively bonded to the walls of the depressions can be varied to suit individual circumstances. Thus, if desired, the beads can be individually coated and placed in the depressions or some equivalent technique can be employed. Any suitable adhesive which resists in its set form attack by the electrolyte in the electrochemical cell in which the electrode is to be used is suitable for the present purposes. For example, the following adhesives are useful for these purposes:

As a specific example of the present method, a mild steel tool of the configuration shown in the single FIGURE has been fabricated utilizing two plates each having the following approximate dimensions: Pins corresponding to pins 16 in the single FIGURE and fabricated of tool steel were inserted in the lowermost of the two plates. Each pin had the following dimensions: shaft-cylindrical-0.25" long×0.084" diameter; head-0.110" diameter×0.05" thick; protrusion-hemispherical-0.040" diameter. The pins were set in the following configuration and spacing: a square configuration with 9 rows of 9 pins each was used, each pin being evenly spaced from each other pin and the total area being 1.25"×1.25".

A total number of 81 pins were used in the tool. The tool was placed against the surface of the electrode and the protrusions were forced thereinto by means of 5-tons pressure exerted by a hydraulic press. Each protrusion had an average maximum diameter of 0.040", as stated above, and thus was capable of receiving glass beads of 0.035" diameter. The dimpled surface of the silver electrode was placed against the 0.035" diameter beads disposed in a rack after the beads had been kiss coated with anaerobic methyl methacrylate adhesive compound. The dimpled electrode surface was aligned to have the depressions therein receive the coated portions of the beads. Pressure was applied to fully seat the beads, after which the rack was removed and the adhesive allowed to set. Full setting occurred over 1 minute. The finished beaded electrode was then ready for use in an electrochemical cell such as a silver-aluminum cell.

The method of the present invention is equally applicable to beading of other types of deformable electrode surfaces utilizing beads of glass, ceramic, plastic or the like electrically nonconductive material of any suitable shape. It will be understood that the protrusions on the dimpling tool will generally conform to the size and shape of those portions of the beads which are to be held within the surface of the electrode in accordance with the present method.

Various modifications, changes, alterations and additions can be made in the method of the present invention, its steps and parameters and in the tool of the present invention, its components and parameters. All such modifications, changes, alterations and additions as are within the scope of the appended claims form part of the present invention.

What is claimed is:

1. An improved method of beading deformable electrodes, said method comprising:

a. forming a plurality of spaced depressions in at least one surface of an electrode of sintered plaque of one of silver, nickel and cadmium metal, said surface being deformable only under increased pressure, by positioning a deforming tool comprising a flat plate having a plurality of spaced steel pins releasably secured thereto bearing depression - imparting steel protrusions extending from the free ends thereof below the bottom of said plate, such that said protrusions contact said deformable electrode surface, said protrusions having a strength greater that that of said electrode surface, said electrode surface being not readily subject to plastic flow at low pressure, forcing said protrusions into said deformable electrode surface under pressure and thereafter withdrawing said protrusions from said deformed electrode surface; and, b. adhesively binding non-conductive beads selected from plastic, glass, ceramic and mixtures thereof in said depressions so as to collectively form a non-conductive separator on said surface, said beads being readily crushable and/or deformable by said electrode surface.

* * * * *